United States Patent [19]

Seki et al.

[11] Patent Number: 4,829,028
[45] Date of Patent: May 9, 1989

[54] PROCESS FOR PRODUCING AN ALUMINA-ZIRCONIA COMPOSITE SINTERED MATERIAL

[75] Inventors: Ichiro Seki, Maebashi; Morinosuke Kano, Gunma; Akihiko Fujii, Numata; Akihiro Kano; Isao Isa, both of Gunma, all of Japan

[73] Assignee: The Japan Carlit Co., Ltd., Tokyo, Japan

[21] Appl. No.: 136,514

[22] Filed: Dec. 22, 1987

Related U.S. Application Data

[63] Continuation-in-part of Ser. No. 901,785, Aug. 28, 1986, abandoned.

[30] Foreign Application Priority Data

Oct. 25, 1985 [JP] Japan .............................. 60-237563

[51] Int. Cl.$^4$ .................. C04B 35/10; C04B 35/48
[52] U.S. Cl. ................... 501/105; 501/107; 501/127; 423/608; 423/625
[58] Field of Search ............ 501/105, 107, 153, 127; 423/608, 625

[56] References Cited

U.S. PATENT DOCUMENTS

| | | | |
|---|---|---|---|
| 2,271,366 | 1/1942 | Field | 501/105 OR |
| 2,535,526 | 12/1950 | Ballard et al. | 501/104 OR |
| 3,000,703 | 9/1961 | Brugger | 423/608 OR |
| 3,249,449 | 5/1966 | Kiehl et al. | 501/107 X |
| 3,360,203 | 12/1967 | Smoke et al. | 501/153 X |
| 3,749,763 | 7/1973 | Scammon, Jr. et al. | 423/608 OR |
| 4,053,321 | 10/1977 | Okumiya et al. | 501/105 OR |
| 4,139,394 | 2/1979 | Esnoult | 501/105 OR |
| 4,218,253 | 8/1980 | Dworak et al. | 501/87 X |
| 4,279,655 | 7/1981 | Garvie et al. | 423/608 X |
| 4,331,048 | 5/1982 | Dworak et al. | 501/105 X |
| 4,366,254 | 12/1982 | Rich et al. | 501/87 X |
| 4,421,861 | 12/1983 | Claussen et al. | 501/152 X |

FOREIGN PATENT DOCUMENTS

| | | | |
|---|---|---|---|
| 2210201 | 9/1973 | Fed. Rep. of Germany | 501/135 |
| 746895 | 6/1969 | France | 423/608 |
| 2005031 | 12/1969 | France | 501/105 |

OTHER PUBLICATIONS

Ceramic Industry, Jan. 1986, vol. 126, No. 1, pp. 74, 75, 137, 138.

Wilks et al., "Plasma Process for Zirconium Dioxide", Chemical Engineering Progress, vol. 68, No. 4, Apr. 1972, pp. 81–83.

*Primary Examiner*—William R. Dixon, Jr.
*Assistant Examiner*—Karl Group
*Attorney, Agent, or Firm*—Frishauf, Holtz, Goodman & Woodward

[57] ABSTRACT

Alumina-zirconia composite sintered materials having sufficient high-temperature strength and thermal shock resistance as well as excellent mechanical strength are made by mixing Bayer alumina and/or bauxite as an alumina and baddeleyite and/or zircon sand as a zirconia material in amounts of 50 to 95% by weight of alumina, the balance being zirconia, respectively, subjecting the mixture to heating, melting and quenching, grinding the resulting solid to an average grain size of 10 μm or smaller, and subjecting the resulting powder to molding and sintering.

8 Claims, No Drawings

PROCESS FOR PRODUCING AN ALUMINA-ZIRCONIA COMPOSITE SINTERED MATERIAL

This application is a continuation-in-part of application Ser. No. 901,785, filed Aug. 28, 1986, now abandoned.

BACKGROUND OF THE INVENTION

1. Field of the Invention

This invention relates to a process for producing an alumina-zirconia composite sintered material which is useful for structural materials, electronic materials, heat-resistant and heat-insulating materials, cutting tool materials, grinding materials, polishing materials, etc.

2. Description of the Prior Art

It is said that a sintered material (a so-called ceramic) of an oxide or non-oxide inorganic powder, when produced at lower temperatures so as to have a high density, has a high mechanical strength because the growth of constituent grains in the sintered material is suppressed. The lower sintering temperature leads to savings in energy and enables the use of various easier methods for obtaining the necessary temperature.

Hence, production processes for various inorganic powders have been developed. As to production of alumina-zirconia composite powder, there are known processes wherein aluminum chloride and zirconium chloride are reacted in a gaseous phase to obtain an alumina-zirconia powder [Japanese Patent Public Disclosure (Laid-Open Publication) Nos. 128268/1984 and 131860/1985]. These processes, however, have the following drawbacks. Since the starting materials are chlorides, the materials used for reactors must have corrosion resistance; chloride ion inevitably comes into the reaction product; separation of chloride ion is difficult; and for the chloride ion released out of the reaction system, measures must be taken for prevention of the public hazard potentially caused by the chloride ion. When the reaction product is calcined in order to remove the chloride ion, agglomeration of the product occurs because the product is a fine powder. This requires adequate disintegration, particularly when the product is used as, for example, a structural material. Thus, when an alumina-zirconia composite powder is mass-produced in a reaction system wherein chlorine is generated from the chloride ion as a by-product, there are many problems to be solved, which inevitably increases costs.

Meanwhile, when an alumina powder and a zirconia powder are merely mixed and the resulting mixture is molded and heated to obtain a sintered material, uniform dispersion of zirconia in alumina does not take place, thus making sintering difficult. Hence, elevation of the sintering temperature becomes necessary. As a result, growth of alumina grains in the sintered material is promoted and the sintered material suffers from reduced mechanical strength. Consequently, the sintered material is not suitable for use as, for example, a structural material.

There is also a method for obtaining an alumina-zirconia sintered material, wherein alumina and zirconia each purified and having a high purity are separately ground and sifted and then are mixed with each other and sintered. The sintered material thus obtained, however, has poor sinterability. Therefore, in order to obtain a sintered material of high density, there is usually employed hot pressing or hot isostatic pressing wherein sintering is conducted not only under a high temperature but also under an applied pressure.

SUMMARY OF THE INVENTION

It is therefore an object of the present invention to provide a process for producing an alumina-zirconia composite sintered material having excellent mechanical strength by mixing Bayer alumina and/or bauxite as an alumina material and baddeleyite and/or zircon sand as a zirconia material in amounts of 50 to 95% by weight of alumina, balance being zirconia, respectively, subjecting the resulting mixture to heating, melting and quenching, grinding the resulting solid to an average grain size of 10 $\mu$m or smaller, and subjecting the resulting powder to molding and sintering.

Other objects and advantages of the present invention will become apparent to those skilled in the art form from the following description and disclosure.

DETAILED DESCRIPTION OF THE PREFERRED EMBODIMENTS

The present process uses as raw materials of alumina and zirconia, Bayer alumina and/or bauxite, and baddeleyite and/or zircon sand, respectively. The impurities in these raw materials are not critical. Alumina and zirconia components are added in amounts of 50 to 95% by weight and balance 50 to 5% by weight, respectively. When zirconia is added in an amount of smaller than 5% by weight, the sintering characteristic of the powder produced fails to shows any of the advantages of zirconia addition. When zirconia is added in an amount exceeding 50% by weight, a sintered material of the powder produced has a significantly reduced strength, and use of such a large amount of zirconia, which is more expensive than alumina is uneconomical. A mixture of alumina and zirconia in said ratio is heated and melted at a temperature higher than the melting point in a furnace such as an arc furnace, a high-frequency induction heating furnace, an image furnace, a gas furnace or the like to obtain a uniform melt. When alumina and zirconia both of low purity are used, the low-boiling substances present in this heating and melting process are evaporated and the high-gravity substances also present therein are separated in order to purify the alumina and zirconia. Then, the melt is quenched. Various quenching methods can be used, such as a method wherein a melt is placed between metal plates each having a thickness sufficient to cool the melt and not easily reacting with the melt, a method wherein a melt is passed between a plurality of rollers, a method wherein a melt is interposed between metal plates each having a thickness sufficient to cool the melt and not easily reacting with the melt and, in this state, is passed between rollers, a method wherein a melt is injected onto a rotating disc in thin streams, and a method wherein a melt is blown by compressed air or the like to form droplets and the droplets are dropped into water.

The alumina-zirconia quenched material thus obtained is a solid rich in tetragonal system (t phase) wherein alumina and zirconia are uniformly dispersed and the crystal phase of zirconia is metastable. For imparting a heat-insulating or heat-resistant property, the solid is ground to an average grain diameter of 10 $\mu$m or smaller using an appropriate grinding machine, when a sintered material of relatively low strength is desired. Grinding is conducted to an average grain diameter of 5 $\mu$m or smaller when a sintered material of very excellent mechanical strength is desired and to an average grain diameter of 1.5 μm or smaller when a sintered material of excellent mechanical strength is produced at a low sintering temperature. When economy and the dimensional stability of sintered material are important, it is advisable to conduct grinding so as to achieve the minimum average grain diameter of about 0.1 μm. In grinding, it is possible to add alumina or zirconia or other components in order to exchange the sinterability, strength and moldability of a powder produced or to give a desired color to the sintered material produced from the powder. When alumina or zirconia is added in order to change the ratio of alumina and zirconia, it is advisable to control the maximum addition amount to about the same level as the quenched material weight. When the amount added is too large, it happens in some cases that the powder produced by grinding is significantly deteriorated in sinterability, mechanical strength at normal and high temperature, and durability in the face of rapid temperature change. When grinding is conducted by a wet method using a liquid medium such as water or the like, it is desirable after grinding to conduct drying by a method such as fluidized drying, spray drying or freeze drying as formation of agglomerates by agglomeration of grains is then less likely to occur. However, formation of such agglomerates as can easily be destroyed by means of a press during molding is acceptable.

The dried powder thus obtained is subjected to molding in an appropriate die and, as necessary, to a treatment by a monoaxial press, a hydrostatic press or the like and then is sintered at atmospheric pressure, whereby a sintered material is obtained which is suitable for use in various applications. Feasible applications include those requiring high strength and high toughness (e.g. ceramic tool, guide roller, die for wire drawing, mechanical seal, guide for spinning, grinding medium, material for grinder lining), those requiring thermal shock resistance (e.g. parts such as a roller inside a tunnel furnace, as sagger, crucible, spacer for high output ICs), and those requiring high strength, high toughness and high thermal shock resistance (e.g. materials for ceramic engines, powder for heavy grinding, cutting bite). When the sintering temperature is lower than 1,200° C., sintering does not proceed adequately, resulting in the sintered material having reduced mechanical strength. When the sintering temperature is higher than 1,800° C., the growth of constituent grains in the sintered material is promoted, causing reduction of density and a sharp reduction in mechanical strength. Therefore, sintering at 1,200° to 1,800° C. is desirable.

The effects of the present invention will be shown below by way of Examples and Comparative Examples which are given here for illustrative purposes only and are by no means intended to limit the scope of the invention.

EXAMPLE 1-A

Bayer alumina as an alumina material and baddeleyite as a zirconia material were mixed in weight ratios as shown in Table 1. The resulting mixtures were heated and melted at about 1,800° to 2,500° C. in an arc furnace to obtain uniform melts. Each melt was poured between iron plates and quenched. The resulting solids were ground. Grinding was conducted in a vibration mill by a wet method using water as a medium. The resulting slurries each containing an alumina-zirconia fine powder, after having the grain size distribution measured, were spray-dried using a spray drier to obtain dried powders. In the measurement of gran size distribution, a centrifugal precipitation type grain size distribution tester was used; water was used as a precipitating agent; and a few drops of sodium pyrosulfate were used as a dispersing agent. Alumina-zirconia composite powders each having an average grain diameter of 1.5 μm or smaller were obtained by controlling the grinding time of the vibration mill.

COMPARATIVE EXAMPLE 1-A

BAyer alumina was ground by a wet vibration mill grinding to obtain a slurry. The measuring method specified by JIS R6002 was employed to control and maintain at 1.5 μm the average grain diameter of the powder formed in the slurry. Then, the slurry was dried using a spray drier to obtain a dried powder. This powder was used as a starting alumina material. Baddeleyite was ground by wet vibration mill grinding to obtain a slurry. By measuring in the same manner as for the alumina, the average grain diameter of the zirconia powder formed in the slurry was controlled and maintained at 1.5 μm. Then, the slurry was dried using a spray drier to obtain a dried powder. This powder was used as a zirconia starting material. The two starting materials were mixed in a V-shaped mixer, in weight ratios as shown in Table 1, to obtain mixed powders of alumina-zirconia wherein each material had an average grain diameter of 1.5 μm.

EXAMPLE 1-B AND COMPARATIVE EXAMPLE 1-B

Each of the powders obtained in Example 1-A was filled in a die and molded into a square pillar shape at a pressure of 300 kg/cm$^2$ using a monoaxial press. This molding was placed in a rubber bag and subjected to a hydrostatic pressure of 1,000 kg/cm$^2$. Then, the molding was placed in an electric furnace and sintered for 2 hours at an atmospheric pressure in an air atmosphere with the maximum sintering temperature controlled at 1,500° C. Each sintered material obtained was measured for density by the Archimedes method, for 3-point bending strength by the method specified by JIS R1601, and for toughness by the notched beam method (notch width: 0.1 mm). For comparison, each of the mixed powders obtained in Comparative Example 1-A was molded and sintered in the same procedure as above. Each sintered material obtained was measured for the same physical properties. The results are shown in Table 1.

TABLE 1

|  | Weight ratio of raw materials | | Density (g/cm$^3$) | 3-point bending strength (MN/m$^2$) | Toughness (MN/m$^{1.5}$) | Melting temp. (°C.) |
| --- | --- | --- | --- | --- | --- | --- |
|  | Alumina | Zirconia |  |  |  |  |
| Ex. 1-B | 95 | 5 | 3.98 | 510 | 4.5 | 1930< |
|  | 85 | 15 | 4.13 | 690 | 5.5 | 1900< |
|  | 75 | 25 | 4.31 | 610 | 5.7 | 1850< |

TABLE 1-continued

| | Weight ratio of raw materials | | Density (g/cm³) | 3-point bending strength (MN/m²) | Toughness (MN/m^1.5) | Melting temp. (°C.) |
|---|---|---|---|---|---|---|
| | Alumina | Zirconia | | | | |
| | 55 | 45 | 4.62 | 550 | 5.8 | 1820< |
| Comp. Ex. 1-B | 95 | 5 | 3.95 | 150 | 2.4 | |
| | 85 | 15 | 4.08 | 210 | 2.7 | |
| | 75 | 25 | 4.21 | 180 | 2.7 | |
| | 55 | 45 | 4.43 | 120 | 2.5 | |

EXAMPLE 2-A

Bayer alumina as an alumina material and baddeleyite as a zirconia material were mixed in a weight ratio of 75:25. The resulting mixture was heated and melted in an arc furnace. The subsequent procedure was the same as in Example 1, and two kinds of alumina-zirconia composite powders were obtained each having an average grain diameter of 1 μm. One powder was obtained by adding, in wet vibration mill grinding, 33% by weight each, per 100% by weight of the quenched material, of Bayer alumina and baddeleyite for weight increase. The other powder was obtained by adding, in wet vibration mill grinding, 66% by weight, per 100% by weight of the quenched material, of Bayer alumina to convert the alumina-to-zirconia weight ratio to 85:15. A centrifugal precipitation type grain size distribution tester was used in measurement of grain size distribution.

COMPARATIVE EXAMPLE 2-A

A commercially available, easily sinterable alumina was used as an alumina material. This alumina had an average grain diameter of 1 μm when measured by a centrifugal precipitation type grain size tester. Baddeleyite subjected to wet vibration mill grinding was used as a zirconia material. This baddeleyite had an average grain diameter of 1 μm when measured by the centrifugal precipitation type grain size tester. The two materials were mixed in a V-shaped mixer in alumina-to-zirconia weight ratios of 85:15 and 75:25, to obtain two alumina-zirconia mixed powders each having an average grain diameter of 1 μm.

EXAMPLE 2-B AND COMPARATIVE EXAMPLE 2-B

The composite powders obtained in Example 2-A were molded and sintered in the same procedure as in Example 1-B, except that each molding was sintered at five different temperatures from 1,200° to 1,800° C. and each sintering at respective temperatures was conducted for 2 hours and then each sintered material was quenched. The sintered materials were measured for density, 3-point bending strength and toughness, and the results are shown in Table 2. For comparison, the mixed powders obtained in Comparative Example 2-A were molded and sintered in the same procedure as above. The sintered materials were measured for the same physical properties. The results are shown in Table 2. The two sintered materials obtained above by sintering the two composite powders of Example 2-A for 2 hours at 1,500° C. were measured for 3-point bending strength at high temperatures as well as for thermal shock resistance. The thermal shock resistance test was conducted by keeping a test piece at a predetermined high temperature, throwing the test piece into boiling water to impact a thermal shock and the measuring the 3-point bending strength of the test piece. The results are shown in Table 3 and 4.

TABLE 2

| | Weight ratio of raw materials | | Properties tested | Sintering temperature (°C.) | | | | |
|---|---|---|---|---|---|---|---|---|
| | Alumina | Zirconia | | 1200 | 1400 | 1500 | 1600 | 1800 |
| Ex. 2-B | 85 | 15 | Density (g/cm³) | 3.51 | 3.70 | 4.09 | 3.91 | 3.88 |
| | | | 3-point bending strength (MN/m²) | 210 | 480 | 630 | 480 | 230 |
| | | | Toughness (MN/m^1.5) | 5.0 | 5.5 | 5.6 | 5.4 | 4.5 |
| Comp. Ex. 2-B | 85 | 15 | Density (g/cm³) | 2.31 | 2.63 | 3.32 | 3.36 | 4.05 |
| | | | 3-point bending strength (MN/m²) | —* | 21 | 66 | 71 | 250 |
| | | | Toughness (MN/m^1.5) | —* | 2.5 | 3.3 | 3.5 | 4.1 |
| Ex. 2-B | 75 | 25 | Density (g/cm³) | 3.61 | 3.78 | 4.23 | 4.16 | 4.13 |
| | | | 3-point bending strength (MN/m²) | 160 | 370 | 580 | 210 | 180 |
| | | | Toughness (MN/m^1.5) | 2.5 | 3.3 | 5.7 | 3.0 | 2.8 |
| Comp. Ex. 2-B | 75 | 25 | Density (g/cm³) | 2.25 | 2.54 | 2.85 | 2.93 | 4.00 |
| | | | 3-point bending strength (MN/m²) | —* | 51 | 63 | 65 | 230 |
| | | | Toughness (MN/m^1.5) | —* | 2.8 | 3.5 | 3.7 | 4.3 |

*Because of insufficient strength, sample preparation was impossible. Accordingly, testing was also impossible.

TABLE 3

3-point bending strengths (MN/m²) at high temperatures

| Weight ratio of raw materials | | Temperatures (°C.) | | | | | | | |
|---|---|---|---|---|---|---|---|---|---|
| Alumina | Zirconia | 600 | 700 | 800 | 900 | 1000 | 1100 | 1200 | 1300 |
| 85 | 15 | 450 | 440 | 455 | 460 | 350 | 300 | 200 | 150 |
| 75 | 25 | 345 | 265 | 200 | 320 | 180 | 225 | 180 | 140 |

TABLE 4

| Weight ratio of raw materials | | Thermal shock resistance test (MN/m²) Temperature difference (°C.) | | | | | |
|---|---|---|---|---|---|---|---|
| Alumina | Zirconia | 100 | 300 | 500 | 700 | 900 | 1100 |
| 85 | 15 | 620 | 650 | 610 | 580 | 550 | 420 |
| 75 | 25 | 600 | 620 | 570 | 550 | 410 | 380 |

EXAMPLE 3-A

Zircon sand was heated and melted in an arc furnace to vaporize silica (SiO2) present in the Zircon sand and to enhance the purity of zirconia. Then, the melt was cooled, solidified, ground, and passed through a sieve having screen opening of 44 μm to obtain a powder. This powder was used as a zirconia material. Bauxite was heated and melted in an arc furnace, during which time impurity components of high specific gravity were precipitated and impurity components of low boiling point were vaporized to enhance the purity of alumina. Then, the melt was cooled, solidified, ground and passed through a sieve having screen opening of 44 μm to obtain a powder. This powder was used as an alumina material. These two powders were mixed in alumina-to-zirconia weight ratios of 85:15 and 75:25. Each mixture was molded into a round stick. The stick was fixed inside an image furnace using a xenon arc lamp as a heat source, and the stick was melted from the lower end. The resulting melt was dripped vertically and passed between two rotating rollers for quenching. Each solid thus obtained was ground in a mortar and then finely ground using a jet mill ot obtain four alumina-zirconia composite powders each having an average grain diameter of 5 μm or 10 μm. The grain size measurement was conducted in accordance with the precipitation test method specified by JIS R6002.

COMPARATIVE EXAMPLE 3-A

The zirconia material and the alumina material both used in Example 3-A were ground by a jet mill so as to each have average grain diameters of 5 μm and 10 μm. The grain size measurement was conducted in accordance with the precipitation test method specified by JIS R6002. The zirconia and alumina powders of the same grain diameter were mixed in a V-shaped mixer in alumina-to-zirconia weight ratios of 85:15 and 75:25 to obtain four alumina-zirconia mixed powders.

EXAMPLE 3-B AND COMPARATIVE EXAMPLE 3-B

The composite powders obtained in Example 3-A were molded in a die and subjected to a hydrostatic pressure in the same procedure as in Test Example 1. The resulting moldings were sintered for 2 hours at 1,800° C. in a gas furnace. For comparison, the mixed powders obtained in Comparative Example 3-A were also molded and sintered in the same procedure. These sintered materials were measured for density and 3-point bending strength. The results are shown in Table 5.

TABLE 5

| | Weight ratio of raw materials | | Average grain dia. | Density | 3-point bending strength |
|---|---|---|---|---|---|
| | Alumina | Zirconia | (μm) | (g/cm³) | (MN/m²) |
| Ex. 3-B | 85 | 15 | 5 | 3.98 | 280 |
| | | | 10 | 3.91 | 190 |
| | 75 | 25 | 5 | 4.25 | 275 |
| | | | 10 | 4.18 | 205 |
| Comp. Ex. 3-B | 85 | 15 | 5 | 3.85 | 180 |
| | | | 10 | 3.76 | 130 |
| | 75 | 25 | 5 | 3.98 | 195 |
| | | | 10 | 3.84 | 160 |

EXAMPLE 3 AND COMPARATIVE EXAMPLE 3

Each of the composite powders obtained in Example 1-A was thoroughly mixed with a wheat starch paste (a binder) and a grease (a wax). The resulting mixture was passed through an extrusion pelletizer to obtain cylindrical pellets. The pellets were sintered in an electric furnace for 2 hours at 1,500° C. at an atmospheric pressure in an air atmosphere. For comparison, the mixed powders obtained in Comparative Example 1-A were pelletized and sintered in the same procedure. All the sintered materials obtained were passed through sieves. The grains which passed through a sieve having screen opening of 2,000 μm but which failed to pass through a sieve having screen opening of 1,600 μm were collected and measured for single grain crushing strength by an Amsler type compressor and for Knoop hardness (load: 100 g) by a Knoop hardness tester. The results are shown in Table 3.

TABLE 6

| | Weight ratio of raw materials | | Single grain crushing strength | Knoop hardness |
|---|---|---|---|---|
| | Alumina | Zirconia | (kg) | (kg/mm²) |
| Ex. 3 | 95 | 5 | 97 | 1460 |
| | 85 | 15 | 110 | 1550 |
| | 75 | 25 | 103 | 1470 |
| | 55 | 45 | 95 | 1350 |
| Comp. Ex.3 | 95 | 5 | 89 | 1400 |
| | 85 | 15 | 98 | 1460 |
| | 75 | 25 | 93 | 1450 |
| | 55 | 45 | 87 | 1250 |

COMPARATIVE EXAMPLE 4-A

The alumina source used was a high purity alumina having a purity of 99.99% and an average grain diameter of 0.5 μm, and the zirconia source used was a high purity zirconia having a purity of 99.5% and an average grain diameter of 1 μm. These alumina and zirconia sources were weighed so as to give raw material weight ratios as shown in Table 1 and then subjected to wet mixing in an alumina pot by measn of alumina balls using methanol as a dispersing agent. The resulting mixtures were dried to obtain high purity alumina-zirconia mixed powders.

COMPARATIVE EXAMPLE 4-B

The powders obtained in Comparative Example 4-A were packed in a mold and subjected to molding at a pressure of 300 kg/cm² by means of a monoaxial press. The resulting molded materials were subjected to hydrostatic pressing at a pressure of 1,000 kg/cm² and then to sintering in a graphite die at 1,600° C. and a pressure of 300 kg/cm², whereby sintered materials were obtained. The sintered materials were measured for density according to the Archimedes method, for 3-point bending strength according to the method specified in JIS R1601 and for toughness according to the notched beam method (notch width: 0.1 mm). The results are shown in Table 9.

TABLE 4

| | Weight ratio of raw materials | | Density $(g/cm^3)$ | 3-point bending strength $(MN/m^2)$ | Toughness $(MN/m^{1.5})$ |
| --- | --- | --- | --- | --- | --- |
| | Alumina | Zirconia | | | |
| Comp. | 95 | 5 | 3.98 | 560 | 4.2 |
| Ex. | 85 | 15 | 4.14 | 750 | 5.5 |
| 4-B | 75 | 25 | 4.32 | 710 | 5.6 |
| | 55 | 45 | 4.64 | 620 | 5.8 |

ADDITION TESTS

The following tests which include analysis of the end product composition, show that SiO2 content and also total impurities including the SiO2 content are extremely reduced from the mixtures of a bauxite material and a zircon sand as a result of the melting process. However, the SiO2 content was not reduced by the firing process. The low SiO2 content (below 1.5% by weight) is also shown to contribute important improved physical properties to the final product as shown in the following:

1. Melting and Firing Experiments

Dehydrated bauxite from Surinam as a bauxite material and zircon sand concentrate from Austrailia as a zircon sand were weighed in various amounts as shown in Table 5 and then mixed together. Samples for a chemical analysis made before melting were collected from the resulting mixtures.

The melting test was carried out using a small-sized arc furnace. A voltage of 85 V was applied to each sample using two cylindrical graphite electrodes having a diameter of 5 in. to supply the sample with a current of 1 to 1.5 kA at maximum, thus carrying out melting for 3 to 5 hours. Thereafter, the resuling melt was quenched by being passed through a gap of about 4 mm defined between two iron plates having a thickness of about 2 cm to obtain a solid. The collected solid for each sample weighed from 50 to 80 kg. Most of the uncollected material was left in the furnace in the form of the self-lining of the furnace. The furnace was provided at its upper part with a duct for removing dust and fumes generated during the operation of the furnace, and such dust and fumes were positively exhausted by suction using a blower.

In a comparative firing test, each sample 15 g was molded at a pressure of 300 kg/cm² using a monoaxial press into a disc 30 mm in diameter and about 5 mm in thickness. The pressed molding was then fired for 2 hours at 1550° C. to obtain a comparative fired material.

These solids and the fired materials were ground in an iron mortar to powders which passed through a sieve having a screen opening of 149 μm. The obtained powders were treated using a magnet and then heated to react in about 3 mol/l of an aqueous hydrochloride acid solution to remove iron mixed into the powder during the grinding process. In this way, samples for a chemical analysis were prepared.

The chemical analysis was conducted in accordance with the method for chemical analysis of aluminous abrasives specified by JIS R6123. More specifically, various components were detected by employing the following methods. Al2O3 was obtained as the balance of the total amount of the following components.

SiO2: molybdenum blue absorptiometric method
Fe2O3: ortho-phenanthroline absorptiometric method
TiO2: aqueous hydrogen peroxide absorptiometric method
ZrO2(HfO2): EDTA solution titrimetric method It should be noted that, since HfO2 cannot be separated by the above-described ZrO2 analyzing method, the ZrO2 shown in Table 6 includes HfO2.

TABLE 5

| | Composition of Raw Materials | | |
| --- | --- | --- | --- |
| No. | Bauxite (kg) | Zircon sand (Kg) | Total (kg) |
| A-1 | 108 | 8 | 116 |
| A-2 | 97 | 22 | 119 |
| A-3 | 85 | 37 | 122 |
| A-4 | 63 | 67 | 130 |

TABLE 6

| | Results of Chemical Analysis (wt %) | | | | | | | | | | | | | |
| --- | --- | --- | --- | --- | --- | --- | --- | --- | --- | --- | --- | --- | --- | --- |
| Chemical | Raw Materials | | Before (Firing or) Melting | | | | After Firing (1550° C.) | | | | After Melting | | | |
| Components | Bauxite | Zircon | A-1 | A-2 | A-3 | A-4 | A-1 | A-2 | A-3 | A-4 | A-1 | A-2 | A-3 | A-4 |
| SiO2 | 3.2 | 32.6 | 5.2 | 8.6 | 12.1 | 18.4 | 5.4 | 8.5 | 12.0 | 18.5 | 0.7 | 0.8 | 0.9 | 1.3 |
| Fe2O3 | 5.9 | — | 5.4 | 4.7 | 4.0 | 2.8 | 5.0 | 4.3 | 3.8 | 2.6 | 0.3 | 0.2 | 0.2 | 0.1 |
| TiO2 | 3.1 | 0.1 | 2.9 | 2.5 | 2.2 | 1.6 | 2.6 | 2.4 | 2.0 | 1.5 | 0.1 | 0.1 | 0.1 | 0.1 |
| ZrO2 | — | 66.9 | 4.9 | 12.4 | 20.3 | 34.5 | 4.7 | 12.4 | 20.2 | 34.6 | 5.3 | 14.5 | 24.6 | 43.9 |
| Al2O3 | 87.9 | 0.4 | 81.9 | 71.8 | 61.4 | 42.7 | 82.3 | 72.4 | 62.0 | 42.8 | 93.6 | 84.4 | 74.2 | 54.4 |

—: Because of very small content or complete absence, no chemical analysis was made.

As will be appreciated from the results in Table 6, the SiO2 content after melting is reduced up to about 1.5% by weight and total impurities are reduced below about 2.0% by weight, which is negligible amount, whereas the SiO2 content and the total impurities after firing were not substantially reduced from the amounts existing before firing or melting. It is considered that the low-boiling substances (e.g., SiO) present in this heating and melting process are evaporated and the high-gravity substances (e.g. FeSi) also present therein are separated whereby the alumina and zirconia are purified.

2. Various Silica Content Experiments

Bayer alumina as an alumina material and baddeleyite as a zirconia material were weighed and mixed in a weight ratio of 75:25. The resulting mixture was heated and melted in an arc furnace to obtain a uniform melt. Each melt was poured between iron plates and quenched. The resulting solid was then ground. Fine grinding was conducted in a vibration mill by a wet method using water and alumina balls as a grinding medium. The grinding time was appropriately controlled and the silica component was adjusted by adding silicon dioxide (SiO$_2$) specified to be a first class grade chemical so as to compensate for an increase in the amount of Bayer alumina due to mixing of worn alumina balls into the powder mixture, thus preparing the powders shown in Table 7.

In the measurement of powder size distribution, a light-transmission centrifugal precipitation type powder size distribution tester was used. The average powder diameter of each sample was about 1.5 μm.

Each ground slurry was dried using a spray drier to obtain dried powders. The powders were filled in a die and molded at a pressure of 300 kg/cm$^2$ using a monoaxial press. The resulting molding was placed in a rubber bag and subjected to a hydrostatic pressure of 1,000 kg/cm$^2$. The pressed molding was then sintered for 2 hours at 1,500° C.

Each sintered material thus obtained was measured for density by the Archimedes method. The sintered material was then cut by means of a diamond blade and polished using a diamond pad. Thereafter, the sintered material was measured for 3-point bending strength by the testing method for flexural strength (modulus of rupture) of high performance ceramics specified by JIS R1601, and for toughness by the notched beam method (notch width: 0.1 mm).

Chemical analysis was conducted in accordance with the method specified by JIS R6123. The relationship between the silica content, and the 3-point bending strength and toughness is shown in Table 7.

TABLE 7

Results of Chemical Analysis and Measurement of properties in Silica Addition Experiment

| Items | S-1 | S-2 | S-3 | S-4 | S-5 |
|---|---|---|---|---|---|
| SiO$_2$ (wt %) | 0.7 | 1.2 | 2.1 | 5.0 | 10.1 |
| Fe$_2$O$_3$ (wt %) | 0.2 | 0.2 | 0.2 | 0.1 | 0.1 |
| TiO$_2$ (wt %) | 0.03 | 0.03 | 0.03 | 0.03 | 0.02 |
| ZrO$_2$ (wt %) | 15.0 | 15.0 | 15.2 | 14.9 | 15.0 |
| Al$_2$O$_3$ (wt %) | 84.0 | 83.6 | 80.1 | 80.0 | 74.8 |
| Density (g/cm$^3$) | 4.08 | 4.07 | 4.04 | 3.55 | 3.22 |
| 3-Point Bending Strength (MN/cm$^2$) | 610 | 650 | 520 | 400 | 320 |
| Toughness (MN/m$^{1.5}$) | 5.6 | 5.7 | 5.6 | 4.4 | 3.7 |

As will be appreciated from the results shown in Table 7 the 3-point bending strength and toughness of the sintered materials having an SiO$_2$ content of up to about 1.5% by weight are remarkably excellent.

As will be appreciated from the results of the Examples and Comparative Examples, a material obtained by subjecting the present composite powder to molding and sintering is superior in sinterability and mechanical strength to a material obtained by merely mixing alumina and zirconic and then subjecting the mixture to molding and sintering, and has mechanical strength equivalent to a material obtained by subjecting alumina and zirconia both of high purity to hot pressing. Therefore, in the present process, inexpensive raw materials can be used and yet a final product material having a SiO$_2$ content reduced down to about 1.5% of less is obtained. Thus, material with high strength can be obtained under sintering conditions of atmospheric circumstances and atmospheric pressure without requiring any special equipment for pressure application. said materials have excellent 3-point bending strength and toughness. Said material further has sufficient high-temperature strength and sufficient shock resistance. Therefore, the material can be used not only at room temperature sites but also at high temperature sites or at sites where low temperatures and high temperatures are alternated. Using oxides as the raw materials, the materials can be used in various atmospheres including oxidizing and reducing atmospheres.

What is claimed is:

1. A process for producing an alumina-zirconia composite sintered material comprising mixing at least one member selected from the group consisting of Bayer alumina and bauxite as an alumina material and at least one member selected from the group consisting of baddeleyite and zircon sand as a zirconia material in amounts of 50 to 95% by weight of alumina, the balance being zirconia, respectively, subjecting the resulting mixture to heating, melting and quenching, thereafter grinding the mixture to a powder with an average grain size of 10 μm or smaller, and subjecting the powder to molding and sintering at a temperature of from 1200° to 1800° C. thereby to produce said composite with a SiO$_2$ content of 1.5% wt % or less.

2. The process of claim 1 wherein the sintering is effected under atmospheric pressure.

3. The process of claim 1 wherein the grinding of the mixture is effected to produce an average grain size of 5 μm or smaller.

4. The process of claim 1 wherein the grinding of the mixture is effected to produce an average grain size of 1.5 μm or smaller.

5. The process of claim 1 wherein the grinding of the mixture is conducted by a wet method using a liquid medium.

6. The process of claim 5 wherein the liquid medium is water.

7. The process of claim 1 wherein the sintering temperature is from 1200° to 1600° C.

8. The process of claim 1 wherein the grinding of the mixture is effected to produce an average grain size of about 0.1 microns.

* * * * *